United States Patent
Park (10) Patent No.: US 10,856,380 B2
(45) Date of Patent: Dec. 1, 2020

(54) PHOTOVOLTAIC LIGHTING SYSTEM HAVING INTEGRATED CONTROL BOARD, AND MONITORING SYSTEM USING SAME

(71) Applicant: CHORUSHING CO., LTD, Gumi-si (KR)

(72) Inventor: Dong Sik Park, Gyeongsan-si (KR)

( * ) Notice: Subject to any disclaimer, the term of this patent is extended or adjusted under 35 U.S.C. 154(b) by 0 days.

(21) Appl. No.: 16/646,806

(22) PCT Filed: Aug. 10, 2018

(86) PCT No.: PCT/KR2018/009147
§ 371 (c)(1),
(2) Date: Mar. 12, 2020

(87) PCT Pub. No.: WO2019/059525
PCT Pub. Date: Mar. 28, 2019

(65) Prior Publication Data
US 2020/0305246 A1   Sep. 24, 2020

(30) Foreign Application Priority Data
Sep. 19, 2017   (KR) .................... 10-2017-0120479

(51) Int. Cl.
*H05B 45/10* (2020.01)
*H05B 47/19* (2020.01)
(Continued)

(52) U.S. Cl.
CPC .............. *H05B 45/10* (2020.01); *F21S 8/086* (2013.01); *F21S 9/037* (2013.01); *G08C 17/02* (2013.01);
(Continued)

(58) Field of Classification Search
CPC ........ H05B 45/10; H05B 47/19; H05B 33/08; H05B 47/10; H02J 2300/26; H02J 7/0048;
(Continued)

(56) References Cited

U.S. PATENT DOCUMENTS 9,379,578 B2 * 6/2016 Valois ..................... H05B 45/10
10,251,230 B2 * 4/2019 Urry ......................... F21L 4/02
(Continued)

FOREIGN PATENT DOCUMENTS

| KR | 1020060011803 A | 2/2006 |
|---|---|---|
| KR | 100891352 B1 | 4/2009 |

(Continued)

OTHER PUBLICATIONS

International Search Report for corresponding PCT/KR2018/009147.
Written Opinion of the ISA for corresponding PCT/KR2018/009147.

*Primary Examiner* — Borna Alaeddin
(74) *Attorney, Agent, or Firm* — Egbert Law Offices, PLLC (57) ABSTRACT

Provided in one embodiment of the present invention is a photovoltaic the lighting system comprising: an MPPT circuit unit for controlling a battery charging voltage by calculating the maximum power point of electrical energy generated from a photovoltaic panel; a battery charging unit for charging and discharging, in a battery, the electrical energy controlled by the MPPT circuit unit; a lighting unit in which a plurality of LEDs are combined; a lighting driver for turning on or off the lighting unit by supplying power supplied from the battery; and an integrated control board including a microprocessor, which checks a residual quantity of the battery, overcharging of the battery, a discharge quantity, a discharge time, and a lighting state and brightness (Continued)

of the lighting unit through the MPPT circuit unit, the battery charging unit, and the lighting driver so as to diagnose an error and perform integrated control.

6 Claims, 8 Drawing Sheets

(51) Int. Cl.
*H02J 7/00* (2006.01)
*F21S 8/08* (2006.01)
*F21S 9/03* (2006.01)
*G08C 17/02* (2006.01)

(52) U.S. Cl.
CPC ............ *H02J 7/0048* (2020.01); *H05B 47/19* (2020.01); *H02J 2300/26* (2020.01)

(58) Field of Classification Search
CPC .... H02J 3/38; F21S 8/086; F21S 9/037; F21S 9/03; G08C 17/02; Y02B 20/72; Y02B 20/40; Y02B 10/10; H04M 1/725
See application file for complete search history.

(56) References Cited

U.S. PATENT DOCUMENTS

| | | | |
|---|---|---|---|
| 10,461,531 B2* | 10/2019 | Ellenberger | .......... H02J 7/0024 |
| 10,784,680 B2* | 9/2020 | Ellenberger | .......... H02J 7/0024 |
| 2010/0165618 A1* | 7/2010 | Vissenberg | ............... F21K 9/00 |
| | | | 362/231 |
| 2011/0285292 A1* | 11/2011 | Mollnow | .............. F21V 29/717 |
| | | | 315/113 |
| 2014/0225533 A1 | 8/2014 | Park et al. | |

FOREIGN PATENT DOCUMENTS

| | | |
|---|---|---|
| KR | 1020140030439 A | 3/2014 |
| KR | 101606715 B1 | 3/2016 |

* cited by examiner

PHOTOVOLTAIC LIGHTING SYSTEM HAVING INTEGRATED CONTROL BOARD, AND MONITORING SYSTEM USING SAME

TECHNICAL FIELD

The present invention relates to a solar lighting system having an integrated control board and a monitoring system using the same.

BACKGROUND ART

Recently, in order to handle the resource depletion of fossil fuel, power generation using natural energies, such as wind power, water power, and the sun, is actively researched.

Particularly, power generation using sun energy is highly interested because the corresponding resource is abundant, an installation cost is low, and the restriction of an area is relatively small.

The power generation of sun energy in which such light energy is converted into electric energy can be installed and used at places having a large amount of sunshine, such as the rooftop of a building in the downtown area and the roof of a house, without being limited to the area and topography. Power generation using such sun energy is also used a lot for power supply, such as a streetlamp, a security light, and an exit lamp.

For example, a known streetlamp has a problem in that maintenance and repair costs are increased because externally supplied commercial AC power is used as a power source. Accordingly, the installation of solar cell streetlamps using natural energy is increased.

Accordingly, conventionally, there was proposed an independent type lighting system for turning on streetlamps by autonomously producing and charging energy using sunlight.

Such a conventional independent type streetlamp system is controlled to prevent over-input, over charge, or over-discharge because it includes a controller using a PWM method. In the streetlamp system, history information cannot be checked upon trouble shooting, and situation handling is insufficient when a failure actually occurs.

Furthermore, conventionally, a battery is charged by sunlight and supplies power to a streetlamp. However, if the battery is discharged due to the shortage of a solar radiation quantity, the streetlamp is turned on by power supplied by an external system or maintains a turn-off state.

That is, conventionally, an implementation of the independent type lighting system using new renewable energy is limited because a light is not maintained by only sunlight and the lighting system is substantially inevitably associated with an external system.

Furthermore, a conventional technology has problems in that integrated control is difficult, the number of parts is increased, and thus the number of assembly processes is increased because a charging circuit for controlling power generated from a solar panel, a battery charging and discharging circuit for controlling the charging and discharging of a battery, and a lighting driver for controlling the lighting of a streetlamp are separated into separate substrates and are independently equipped with microprocessors.

Furthermore, rated output (e.g., 15 W, 18 W, 20 W, 25 W, 30 W, 40 W, 45 W, and 50 W) of an LED module installed in a streetlamp is various. Accordingly, the lighting driver needs to supply a current value, output by the LED module, based on the LED module. However, conventionally, there are problems in that an installation cost is added and maintenance and repair are not easy because rated output of the streetlamp is not automatically detected and thus the lighting driver must be replaced depending on the LED module.

DISCLOSURE

Technical Problem

The present invention has been made to solve the above problems occurring in the prior art and, an object of the present invention is to provide a solar lighting system having an integrated control board, wherein the charging circuit of a solar panel, a battery charging and discharging circuit, and an LED driver can be integrated and controlled in a lighting system turned on by electric energy generated from sunlight.

Furthermore, another object of the present invention is to provide a solar lighting system having an integrated control board, which can estimate a maximum power point so that sunlight charging efficiency is optimized based on a change in the solar radiation quantity and can control the generation of sunlight energy and the charging of a battery.

Furthermore, another object of the present invention is to provide a monitoring system using a solar lighting system having an integrated control board for receiving measurement and history information of the lighting system in real time, monitoring whether a failure or abnormality occurs, estimating the possible lighting time of the lighting system, and performing group control so that the solar lighting system cooperates with a near lighting system, and a method using the same.

Technical Solution

The present invention may include the following embodiments in order to achieve the aforementioned objects.

An embodiment of the present invention may provide a solar lighting system having an integrated control board, including an MPPT circuit unit for calculating a maximum power point of electric energy generated from a solar panel and controlling a charging voltage of a battery, a battery charging unit for charging and discharging the battery using the electric energy controlled by the MPPT circuit unit, a lighting unit in which a plurality of LEDs has been combined, a lighting driver for turning on or off the lighting unit by supplying power supplied by the battery, and a microprocessor for diagnosing an error by checking an amount of remaining battery power, over charge of the battery, an amount of discharged battery power, a discharging time of the battery, and a lighting state and brightness of the lighting unit through the MPPT circuit unit, the battery charging unit, and the lighting driver and for performing integrated control.

Furthermore, another embodiment of the present invention may provide a monitoring system using a solar lighting system having an integrated control board, including a plurality of lighting systems, a server for receiving state information from the plurality of lighting systems and monitoring the plurality of lighting systems, and a mobile terminal for receiving, from the server or the lighting systems, a message including error information. The lighting system transmits, to the server, the state information comprising at least one of an amount of charged battery power and an amount of discharged battery power for each time zone, a discharging time of the battery, a charging voltage of the battery, consumption power of a light for each time zone, a turn-on and turn-off time of the lighting unit, and a turn-on maintenance time, environment information comprising at least one of a temperature, humidity, intensity of illumination, a solar radiation quantity, and wind velocity for each time zone, and error information such as over charge or non-charging of the battery and a failure of the lighting unit. The server stores, in a server database, the state information, environment information and error information for each lighting system received from the lighting systems, calculates statistical values, and predicts consumption power and turn-on maintenance time of the lighting unit.

Advantageous Effects

Accordingly, the present invention can have effects in that power generation and charging efficiency are improved by estimating a maximum power point and controlling the charging and discharging of a battery.

Furthermore, the present invention can have effects in that rapid situation handling is possible, the number of parts is reduced, and the number of assembly processes is reduced because conventional separated elements can be integrated into one and controlled through the integrated control board.

Furthermore, there is an effect in that maintenance and repair are easy because abnormality occurrence and measured information of a light can be directly checked through a mobile terminal of the present invention.

Furthermore, the present invention has effects in that energy efficiency is high and an independent lighting system can be implemented without the support of external system power because the brightness of lights can be selectively controlled by combining peripheral illuminance and the amount of charged battery power.

MODE FOR INVENTION

The present invention may be changed in various ways and may have various embodiments, and specific embodiments of the various embodiments are illustrated in the drawings and described in detail.

It is to be understood that the present invention is not intended to be limited to the specific present invention and that the present invention corresponds to any one of all changes, equivalents to substitutions included in the spirit and technological scope of the present invention for connecting and/or fixing structures extended in different directions.

The terms used in this specification are used to only describe a specific embodiment and are not intended to restrict the present invention. An expression of the singular number includes an expression of the plural number unless clearly defined otherwise in the context.

In the specification, it is to be understood that a term, such as "include" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Furthermore, in this specification, in describing the present invention, a detailed description of a related known function or configuration will be omitted if it is deemed to make the gist of the present invention unnecessarily vague.

Hereinafter, preferred embodiments of a solar lighting system having an integrated control board and a monitoring system using the same according to the present invention are described with reference to the accompanying drawings.

Figure 1:
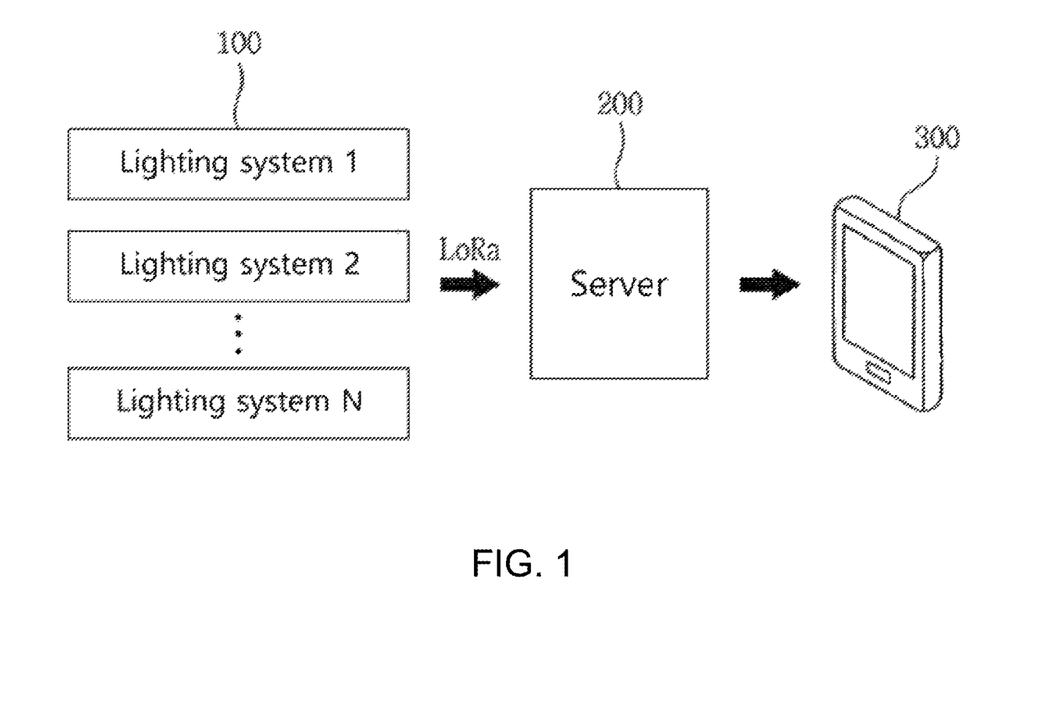
FIG. 1 is a block diagram for describing the outline of the present invention.

FIG. 1 is a block diagram for describing the outline of the present invention.

Referring to FIG. 1, the present invention includes a plurality of lighting systems 100, a server 200 for monitoring the lighting systems 100, and a mobile terminal 300 capable of information check and control through direct/indirect communication with the server 200 and/or the lighting systems 100.

In this case, the plurality of lighting systems 100 has been illustrated as being streetlamps, for example, but is not limited thereto and may include all security lights or indoor and outdoor lights in addition to the streetlamps.

The plurality of lighting systems 100 may charge electric energy generated by sunlight, and may selectively perform on-off or dimming control by detecting peripheral illuminance and time and the human body. Furthermore, the plurality of lighting systems 100 may transmit, to the server 200, state information such as the amount of remaining battery power, a turn-on time and turn-off time, and the amount of power consumption for each time zone, environment information such as a surrounding temperature and humidity, illuminance and an air volume, and error information according to the occurrence of an abnormal situation attributable to an over charge, an over voltage or an over current.

The server 200 may receive state information and error information of the plurality of lighting systems 100, may transmit an alarm message to the mobile terminal 300, may make big data state information of each of the lighting systems 100, may generate prediction information for a possible turn-on time and consumption power of each of the lighting systems 100, and may provide the prediction information to the mobile terminal 300.

The mobile terminal 300 may receive monitoring information (state information, environment information, error information, and prediction information) of each of the lighting systems 100 through an application provided by the server 200, and may directly check or control a control history or state information and error information of each of the lighting systems 100 by performing direct communication with the lighting systems 100.

In this case, the lighting system 100 and the server 200 and/or the mobile terminal 300 are capable of direct or indirect communication, that is, long range wide-area network (LoRa)-based communication.

The lighting system 100, the server 200 and the mobile terminal 300 are described in detail below.

Figure 2:
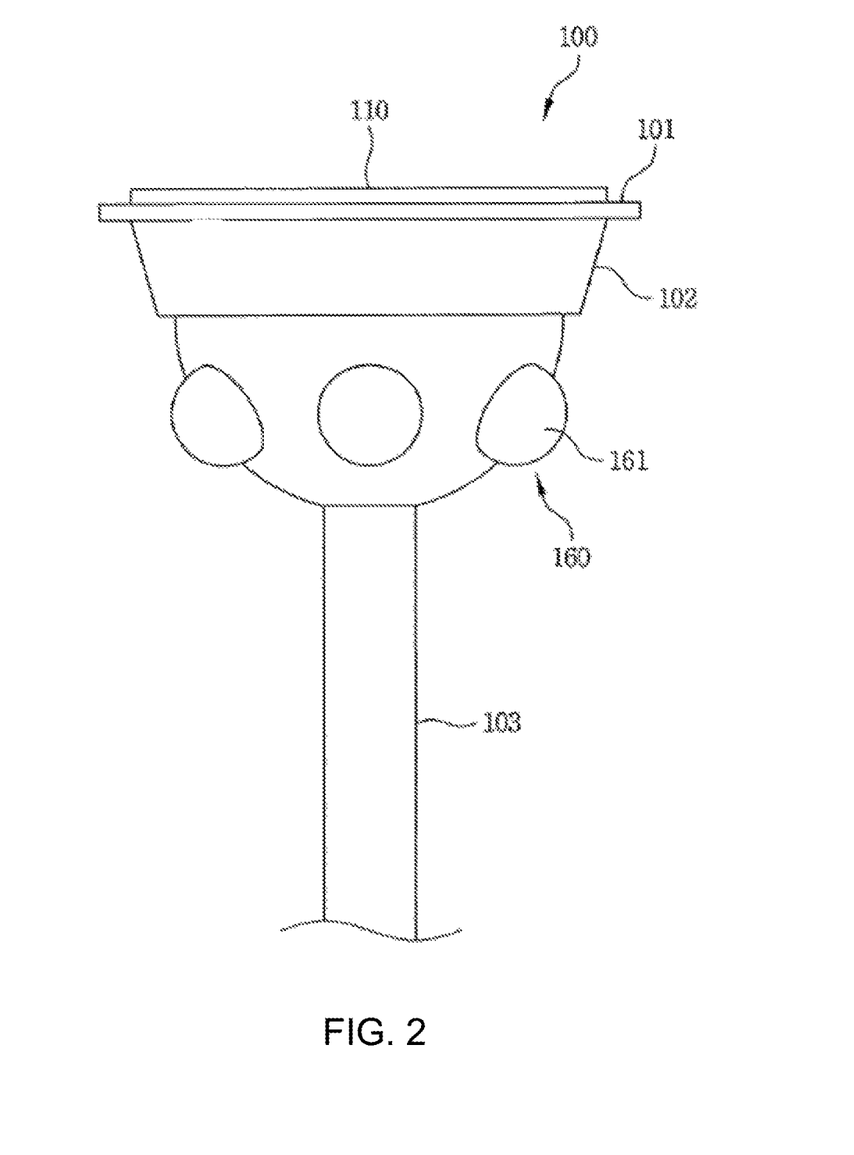
FIG. 2 is a diagram illustrating an example of a streetlamp to which an embodiment of the present invention has been applied.
Figure 3:
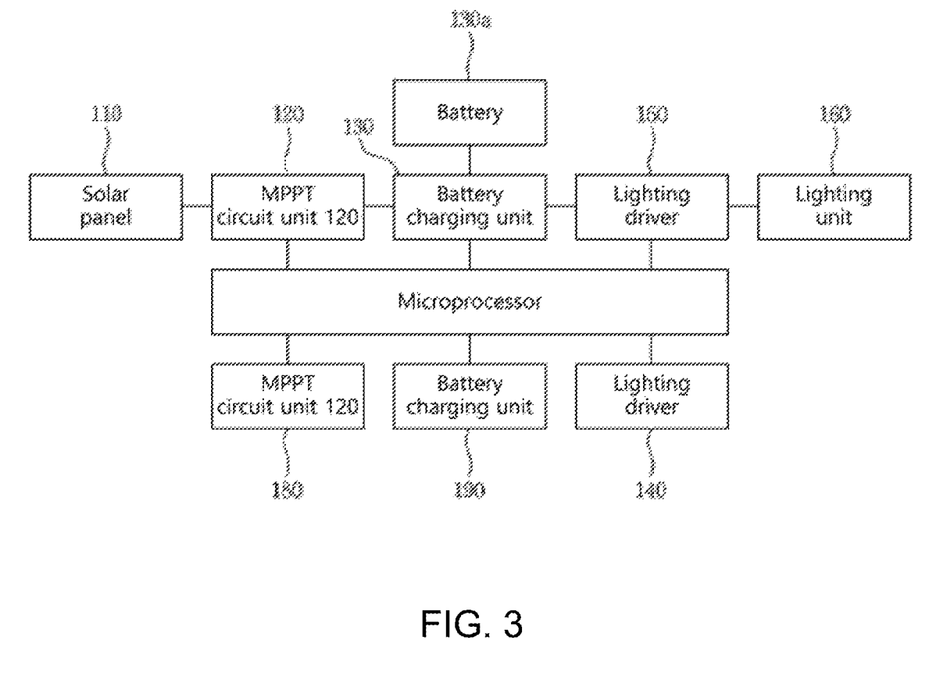
FIG. 3 is a block diagram illustrating a lighting system of the present invention.

FIG. 2 is a diagram illustrating an example of a streetlamp to which an embodiment of the present invention has been applied. FIG. 3 is a block diagram illustrating a lighting system of the present invention.

Referring to FIGS. 2 and 3, the lighting system 100 of the present invention includes a solar panel 110, an MPPT circuit unit 120, a battery charging unit 130, a lighting driver 150, a lighting unit 160, a microprocessor 170, a communication unit 180, a sensor unit 190, a storage unit 140, and a battery 130a.

The solar panel 110 generates electric energy by photoelectric converting incident sunlight.

The MPPT circuit unit 120 estimates a maximum power point for electric energy generated by the solar panel 110, and raises charging efficiency of a battery 130a by controlling a load so that the maximum power point can be maintained. In this case, the MPPT is an abbreviation of maximum power point tracking. In this specification, maximum power point tracking is described as an MPPT in brief.

The battery charging unit 130 controls the charging and discharging of the battery 130a, and may cut off the circuit of the battery 130a under the control of the microprocessor 170. In this case, the battery charging unit detects a material (e.g., a lead storage battery, lithium ion or lithium phosphate iron), battery voltage and maximum capacity of the battery, outputs them to the microprocessor, and performs charging and discharging based on a voltage/current value suitable for the material and capacity of the battery under the control of the microprocessor.

The lighting driver 150 converts and controls power, supplied from the battery 130a, using a configured algorithm, and turns on the lighting unit 160. In this case, the lighting driver 150 turns on or off the lighting unit 160 and controls brightness of the lighting unit 160, under the control of the microprocessor 170. Furthermore, the lighting driver 150 transmits, to the microprocessor 170, the state (turn-on or off) and time of the lighting unit 160 and driving power (supply current and voltage) of the lighting unit.

The lighting unit 160 is configured with a plurality of LEDs, a heat-dissipation plate, a reflection plate and a transparent cover 161, and may be turned on or off under the control of the lighting driver 150. The lighting unit 160 is described by taking a streetlamp as an example. For example, the lighting system 100 may include an inclusion body 102 for accommodating the lighting unit 160 configured with a plurality of LEDs on the top side of a light pole that stands upright on the ground, and the solar panels 110 arranged on the top surface of the inclusion body 102. In this case, the solar panel 110 may be fixed on the top surface of the support plate 101 that forms a flat horizontal plane on the top surface of the inclusion body 102.

Furthermore, the inclusion body 102 has an external surface downward inclined from the top of the light pole 103. The lighting unit 160 configured with the plurality of LEDs is fixed on the inside of the inclusion body 102, and is fixed to illuminate the ground through the block-shaped transparent cover 161 in the downward-inclined external surface of the inclusion body 102.

The microprocessor 170 may be formed in a single integrated board (substrate) along with the MPPT circuit unit 120, the battery charging unit 130, and the lighting driver 150. The microprocessor 170 may diagnose an error by checking the state of the elements, and may integrate and control the elements.

For example, the microprocessor 170 may variably control brightness of the lighting unit 160 in response to the amount of remaining battery (130a) power. That is, when the amount of remaining battery (130a) power is small, the microprocessor 170 may control the lighting driver 150 so that a turn-on time is slowed or a turn-off time is advanced. Alternatively, the microprocessor 170 may control dimming so that brightness of the lighting unit 160 or may turn on the lighting unit 160 only when the human body is detected.

Alternatively, the microprocessor 170 may diagnose whether an error occurs by collecting information received through the MPPT circuit unit 120, the battery charging unit 130 and the lighting driver 150, may generate state information, environment information and error information, and may transmit the information to the server 200.

Furthermore, the microprocessor 170 automatically detects a load of the lighting unit 160, and varies a driving current supplied to the lighting unit 160 by controlling the lighting driver 150. For example, each of LED modules installed in the lighting unit 160 and configured with a plurality of LEDs has different rated output. The microprocessor checks the LED module (not shown) and controls the LED module so that a current value of the lighting driver 150 is varied.

Furthermore, the microprocessor 170 receives and/or automatically recognizes the material, battery voltage and maximum capacity of the battery 130a detected by the battery charging unit 130, and controls the battery charging unit 130 so that charging and discharging are performed based on a voltage/current value suitable for the material and capacity of the battery 130a.

That is, in the present invention, the microprocessor 170, the MPPT circuit unit 120, the battery charging unit 130, and the lighting driver 150 are disposed in an integrated control board. The MPPT circuit unit 120, the battery charging unit 130 and the lighting driver 150 are not equipped with separate microprocessors, but are controlled in an integrated manner by a single microprocessor 170.

A detailed structure of the microprocessor 170 is described with reference to FIG. 4.

Figure 4:
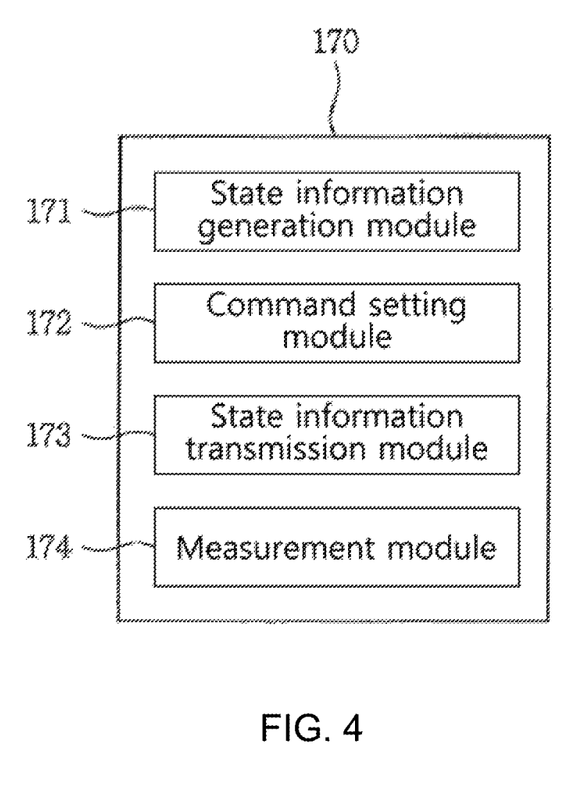
FIG. 4 is a block diagram illustrating a microprocessor.

FIG. 4 is a block diagram illustrating the microprocessor.

Referring to FIG. 4, the microprocessor 170 includes a state information generation module 171, a command setting module 172, a state information transmission module 173, and a measurement module 174.

The state information generation module 171 generates state information, error information and environment information generated by collecting pieces of information detected by the measurement module 174 and the sensor unit 190, and stores the generated information in the storage unit 140. Furthermore, the state information generation module 171 may generate history information including a control and check history of the server 200 and the mobile terminal 300 received from the communication unit 180, and may store the generated history information in the storage unit 140.

In this case, the environment information may correspond to at least one of illuminance, a temperature, a solar radiation quantity, an air volume, and humidity received from the sensor unit 190, for example.

The measurement module 174 monitors the state (turn-on, turn-off or load) of the MPPT circuit unit 120, the battery charging unit 130, the lighting driver 150, and the lighting unit 160 and whether an error (failure or malfunction) occurs in the elements. When an error is detected, the measurement module 174 transmits corresponding information to the server 200 and/or the mobile terminal 300 through the communication unit 180.

For example, when the battery 130a is charged, the measurement module 174 detects an overvoltage, an overcurrent or a temperature, and detects a discharging current and discharging time of the battery 130a and the amount of remaining battery (130a) power.

Preferably, the measurement module 174 may calculate brightness of the lighting unit 160 according to the amount of remaining battery (130a) power. That is, the measurement module 174 may detect the current amount of remaining battery (130a) power, and may calculate the amount of power consumption to the extent that the turn-on of the lighting unit 160 can be maintained up to a set turn-off time and corresponding intensity of brightness.

Furthermore, the measurement module 174 may also detect the current state (e.g., turn-on or intensity or brightness) of the lighting unit 160 based on power information supplied from the lighting driver 150 to the lighting unit 160.

Furthermore, the measurement module 174 detects a load of the lighting unit 160.

The command setting module 172 controls the MPPT circuit unit 120, the battery charging unit 130 or the lighting driver 150 in response to a control command based on a set condition, the detection of the measurement module 174 or a direct command received from the server 200 and/or the mobile terminal 300.

For example, the command setting module 172 generates and outputs a command to control the lighting driver 150 so that brightness of the lighting unit 160 is varied based on the diagnosis of the measurement module 174 or controls the lighting driver 150 based on a load of the lighting unit 160 detected by the measurement module, and varies a driving current value.

Furthermore, when a command based on direct control of the server 200 and the mobile terminal 300 is received, the command setting module 172 may generate and output a control command in response to the corresponding direct command in real time.

Furthermore, the command setting module 172 may also output a command to cut off a circuit by controlling the battery charging unit 130 in response to the detection signal of an overvoltage, an overcurrent or abnormal power by the measurement module 174.

The state information transmission module 173 transmits, to the server 200, state information stored in the storage unit 140 for each set time period, or transmits, to the server 200 and/or the mobile terminal 300, state information generated by the state information generation module 171 in real time. Alternatively, the state information transmission module 173 may search for and transmit state information stored in the storage unit 140 in response to a direct command from the server 200 and/or the mobile terminal 300.

As described above, when the battery 130a is charged, the microprocessor 170 of the lighting system 100 may detect an overvoltage, an overcurrent, the amount of remaining battery (130a) power, the discharging time of the battery, the amount of discharged battery power, and the state of the lighting unit 160, and may perform integrated control by diagnosing whether an error occurs. Furthermore, the microprocessor 170 of the lighting system 100 according to the present invention may variably control brightness of the lighting unit 160 based on the amount of remaining battery (130a) power.

The communication unit 180 performs communication with the server 200 and/or the mobile terminal 300 using a long range wide-area network (LoRa) method. In this case, the communication unit 180 may be assigned unique access information (e.g., URL) so that it is directly accessed by the mobile terminal 300.

The sensor unit 190 outputs, to the microprocessor 170, a signal detected by at least one of an operation sensor, a sunshine sensor, an illuminance sensor, a temperature sensor, a humidity sensor, a temperature sensor or a wind velocity sensor, for example.

The storage unit 140 stores a voltage, current and power of generated electric energy of the MPPT circuit unit 120 generated by the microprocessor 170, the amount of charge remaining in the battery, the amount of discharged battery power and variance of the battery charging unit 130 for each time zone, operation information of the lighting unit 160, environment information (illuminance, an air volume, a solar radiation quantity, a temperature or humidity) of the sensor unit 190 for each time zone, state information such as an error, and a control history between the server 200 and the mobile terminal 300.

Figure 5:
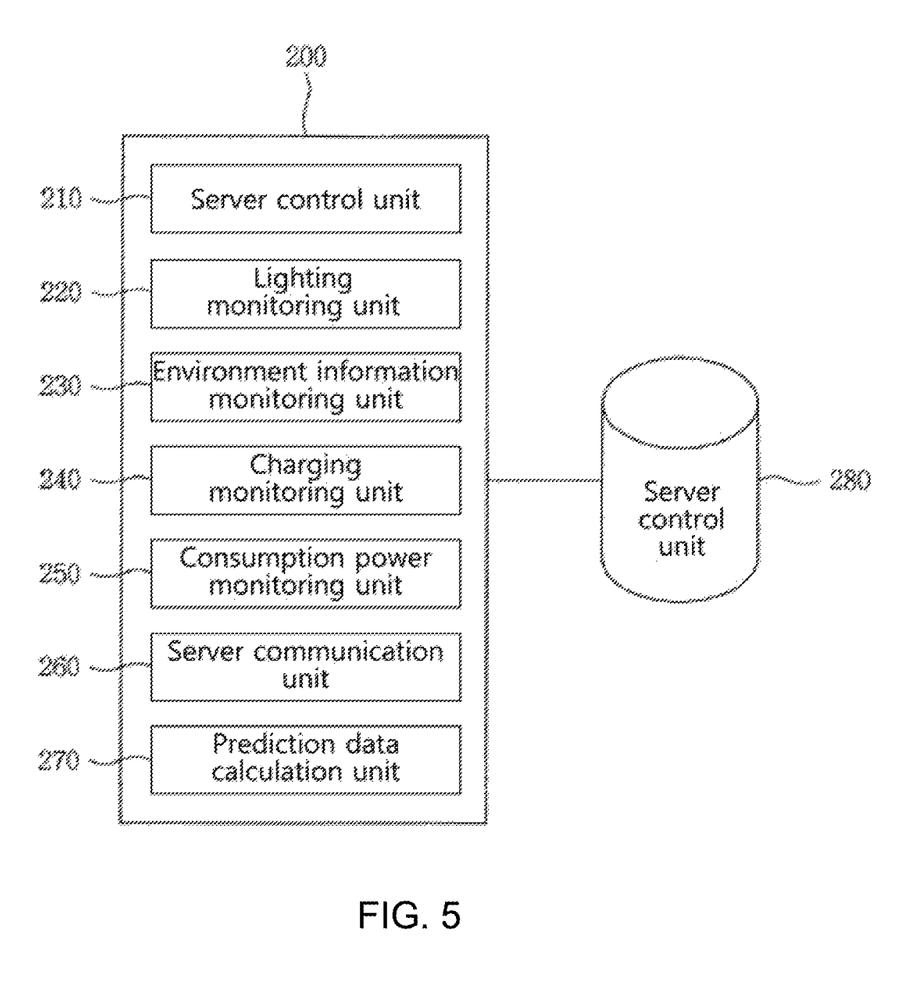
FIG. 5 is a block diagram illustrating a server.

The server 200 is described with reference to FIG. 5. FIG. 5 is a block diagram illustrating the server.

Referring to FIG. 5, the server 200 includes a consumption power monitoring unit 250, a charging monitoring unit 240, an environment information monitoring unit 230, a lighting monitoring unit, a server control unit 210, a server communication unit 260 and a server database 280.

The consumption power monitoring unit 250 monitors consumption power for each day and each time zone of each of the lighting systems 100. In this case, the consumption power monitoring unit 250 calculates consumption power based on state information transmitted by each of the lighting systems 100, and stores, in the server database 280, the calculated consumption power for each of the lighting systems 100. That is, the consumption power monitoring unit 250 monitors consumption power for each year/month/day/time zone of each of the lighting systems 100, and makes big data consumption power information of each of the lighting systems 100.

The charging monitoring unit 240 monitors the amount of charge remaining in the battery 130a (the amount of remaining battery (130a) power), the amount of discharged battery power, and the discharging time of the battery of each of the lighting systems 100 for each time zone, and calculates an average amount of remaining battery (130a) power and an average amount of discharged battery power for each time zone. Such charging monitoring information can be used to calculate a possible turn-on time compared to average consumption power. Charging monitoring information calculated as described above is stored in the server database 280, and may be used as data for the prediction of a possible turn-on time for each year/month/day/time zone in the future.

The environment information monitoring unit 230 calculates the number of sunless days per year based on a solar radiation quantity, illuminance, a temperature, humidity, and an air volume based on environment information of each of the lighting systems 100, and calculates and makes big data average value of each of pieces of information. The big data of such environment information may be used as data for the prediction of the amount of charge remaining in the battery and/or a possible lighting time, and consumption power of each of the lighting systems 100 for each year/month/day, for each season, and for each hour.

The lighting monitoring unit 220 calculates an average value by monitoring a turn-on maintenance time or turn-off maintenance time of each of the lighting systems for each year/month/day/time zone, and stores the average value in the server database 280. The average value is accumulated and calculated in real time based on state information received from each of the lighting systems 100.

The prediction data calculation unit 270 calculates prediction data for predicting the possible day/time zone lighting time of each of the lighting systems 100 based on information received from the charging monitoring unit 240, the environment information monitoring unit 230, and the consumption power monitoring unit 250.

In this case, the prediction data calculates the possible lighting time by predicting consumption power for each time zone from sunset to sunrise time and comparing the predicted consumption power with the amount of remaining battery (130*a*) power.

The server control unit 210 checks the possible lighting time of each of the lighting systems 100 calculated by the prediction data calculation unit 270, and checks a possible lighting time based on a sunrise and sunset time, predicted consumption power for each time zone after sunset, and the amount of remaining battery (130*a*) power checked based on environment information of a corresponding lighting system.

Accordingly, if it is determined that lighting cannot be maintained until sunrise when the lighting system 100 drives the lighting unit 160 based on a previously set condition, the server control unit 210 changes the setting criterion of the corresponding lighting system 100 and transmits the changed criterion to the lighting system 100.

For example, the server control unit 210 may change a setting criterion so that the turn-on and turn-off of a first lighting system and second lighting system that are adjacent each other are alternately performed or may change brightness so that consumption power is reduced to the maximum extent possible by changing the dimming control condition of the lighting system 100.

The changed setting criterion of the server control unit 210 is transmitted to each of the lighting systems 100 as a control command. The microprocessor 170 of the lighting systems 100 changes the setting criterion of the lighting driver 150 in response to the control command from the server control unit 210.

Alternatively, when abnormal information of a specific lighting system 100 is received from the consumption power monitoring unit 250, the charging monitoring unit 240, the environment information monitoring unit 230 or the lighting monitoring unit 220, the server control unit 210 may transmit a direct command to the specific lighting system 100 so that the charging circuit of the lighting unit 160 or the battery 130*a* is cut off.

Furthermore, when abnormal information of the lighting system 100 is received, the server control unit 210 may transmit an alarm and a guide message to the mobile terminal 300, and may directly control the lighting system 100 in response to a command transmitted by the mobile terminal 300.

This may be performed through an alarm (an overvoltage, an overcurrent, a high temperature or whether the battery 130*a* is abnormal) received through the lighting system 100.

The server communication unit 260 performs communication with the lighting system 100 and the mobile terminal 300 under the control of the server control unit 210.

The server database 280 stores state information, environment information and error information received from each of the lighting systems 100, and stores the monitoring results of the consumption power monitoring unit 250, the charging monitoring unit 240, the environment information monitoring unit 230 and the lighting monitoring unit 220 and the prediction data of the prediction data calculation unit 270.

The mobile terminal 300 receives an alarm message or monitoring information from the server 200 through an app executed by an application received from the server 200 and/or the server 200 of another communication company, and outputs the alarm message or monitoring information. In this case, the mobile terminal 300 may directly control the lighting system 100 through the server 200 through a set menu.

For example, the mobile terminal 300 may input a command to stop an operation of each of the lighting systems 100 or a check command for history information of a corresponding lighting system 100, and may receive corresponding results through the server 200 or the lighting system 100.

The present invention includes the aforementioned elements. Hereinafter, a monitoring method of the solar lighting system 100 having an integrated control board, achieved through the aforementioned elements, is described with reference to FIGS. 6 to 8.

Figure 6:
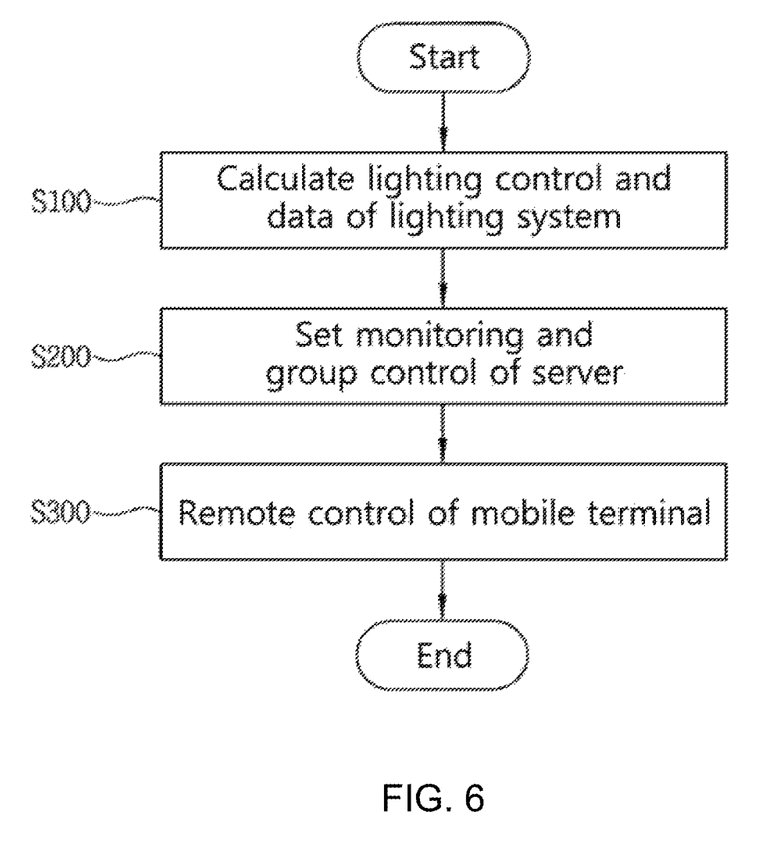
FIG. 6 is a flowchart illustrating a monitoring method using a solar lighting system having an integrated control board according to the present invention.

FIG. 6 is a flowchart illustrating a monitoring method using the solar lighting system having an integrated control board according to the present invention.

Referring to FIG. 6, the present invention includes step S100 of calculating lighting control and data of the lighting system 100, step S200 of setting monitoring and group control of the server 200, and step S300 of remotely controlling, by the mobile terminal 300, the lighting system 100 or the server 200.

Step S100 is the step of controlling, by the lighting system 100, the lighting unit 160 based on a set condition using electric energy generated from the solar panel 110, generating state information, error information and environment information, and transmitting the information to the server 200. This is described in detail with reference to FIG. 7.

Figure 7:
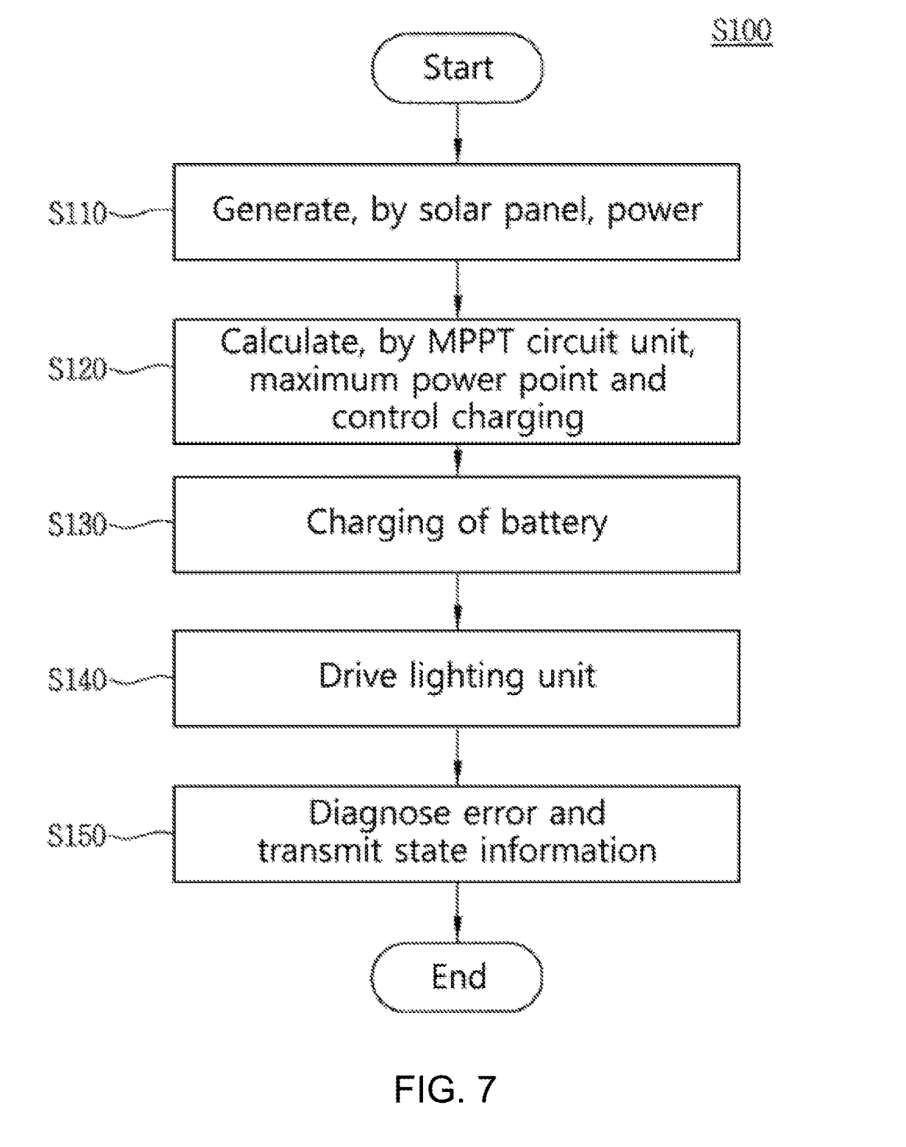
FIG. 7 is a flowchart illustrating step S100.

FIG. 7 is a flowchart illustrating step S100.

Referring to FIG. 7, step S100 includes step S110 of generating, by the solar panel 110, electric energy, step S120 of calculating, by the MPPT circuit unit 120, a maximum power point and controlling charging, step S130 of controlling, by the microprocessor 170, the charging of the battery 130*a* by controlling the battery charging unit 130, step S140 of controlling, by the microprocessor 170, the turn-on of the lighting unit 160 by controlling the lighting driver 150, and step S150 of monitoring, by the microprocessor 170, the MPPT circuit unit 120, the battery charging unit 130 and the lighting driver 150 and transmitting detected information to the server 200.

Step S110 is the step of generating, by the solar panel 110, electric energy. In this case, the inclusion body for accommodating the lighting unit 160 on the top side of the light pole 103 that stands upright on the ground is formed in the lighting system 100. The solar panel 110 is fixed to the support plate 101 that forms a flat plane on the top surface of the inclusion body 102.

Step S120 is the step of extracting, by the microprocessor 170, a maximum power point of the electric energy generated from the solar panel 110 by controlling the MPPT circuit unit 120 and controlling the charging voltage of the battery 130*a* based on the extracted maximum power point. In this case, the microprocessor 170 may extract the maximum power point by increasing or decreasing a voltage value through control of the MPPT circuit unit 120 based on solar radiation quantity detection information of the sensor unit 190.

For example, when a solar radiation quantity is many, the MPPT circuit unit 120 increases a voltage by controlling a load because the amount of power generation is increased and calculates a maximum power point. When a solar radiation quantity is smaller than a setting criterion, the MPPT circuit unit 120 decreases a voltage because the amount of power generation is decreased and calculates a maximum power point. A process of calculating a maximum power point can be more simplified because the calculation of a maximum power point using such a method is based on a solar radiation quantity.

Furthermore, the measurement module 174 meters a voltage, current and power of generated electric energy under the control of the microprocessor 170. Furthermore, the measurement module 174 detects whether abnormal power is present and outputs corresponding information. In this case, the measured voltage, current and power is measured for each time zone.

Furthermore, the measurement module 174 may also detect over charge, non-charging, an abnormal voltage and abnormal current of the battery 130a.

Furthermore, the measurement module 174 detects a load of the lighting unit 160, and transmits the load to the microprocessor 170. The battery charging unit outputs voltage and maximum capacity information of the battery to the microprocessor.

Step S130 is the step of charging, by the microprocessor 170, the battery 130a by controlling the battery charging unit 130. In this case, the measurement module 174 calculates charging data, including a change in the amount of remaining battery (130a) power, including the amount of charge remaining in the battery 130a and the amount of discharged battery power. The charging data may include the amount of charge remaining in the battery and the amount of discharged battery power for each time zone, a temperature of the battery 130a or whether abnormal power has occurred.

Step S140 is the step of turning on, by the microprocessor 170, the lighting unit 160 based on a set condition by controlling the lighting driver 150. In this case, the microprocessor 170 controls the lighting driver 150 so that the lighting unit 160 is selectively turned on or off in response to a human body detection signal or illuminance detection signal detected by the sensor unit 190. For example, the lighting driver 150 may perform dimming control so that brightness of the lighting unit 160 is varied in stages for each time set right after sunset.

Alternatively, when a human body detection signal is received from the sensor unit 190, the microprocessor 170 may selectively turn on the lighting unit 160. Such dimming control or control of the turn-on or off based on the detection of the human body for each time zone may be variably performed based on the amount of remaining battery (130a) power.

In this case, the measurement module 174 calculates operation information, such as the turn-on time or turn-off time of the lighting unit 160, based on operation information (rated voltage, rated current, rated output (load) and time) of the lighting driver 150.

Furthermore, the command setting module 172 controls a driving current value of the lighting driver 150 to be varied based on an automatically detected load of the lighting unit 160. Accordingly, the lighting driver 150 varies and supplies a driving current value of the lighting driver 150 based on a load of the lighting unit 160.

Step S150 is the step of generating, by the microprocessor 170, state information and environment information by collecting data output by the MPPT circuit unit 120, the battery charging unit 130, the lighting driver 150 and the sensor unit 190, diagnosing whether an error occurs based on the state information, generating error information including corresponding results, and transmitting the error information to the server 200.

The state information may include a voltage, a current and power of electric energy generated from the solar panel 110, the amount of charge remaining in the battery 130a, whether the lighting unit 160 is turned on, and the turn-on and turn-off maintenance time of the lighting unit 160. The error information may include over charge, non-charging, an overvoltage, an overcurrent, and an abnormal voltage of the battery 130a, and whether the lighting unit 160 has failed. Furthermore, the environment information is information detected by the sensor unit 190, and may include at least one of illuminance, wind velocity, a temperature, humidity, and a solar radiation quantity in a surrounding environment.

In this case, the microprocessor 170 transmits the state information, environment information, and error information to the server 200 through the communication unit 180.

The error information may be transmitted to the server 200 and/or the mobile terminal 300 in real time.

Step S200 is the step of making, by the server 200, big data state information, error information and environment information received from the lighting system 100, predicting consumption power of each of the lighting systems 100 for each year/month/day or for each season or for each time zone, checking the amount of remaining battery (130a) power, predicting a possible turn-on maintenance time for the day, and directly controlling the lighting system 100. This is described with reference to FIG. 8.

Figure 8:
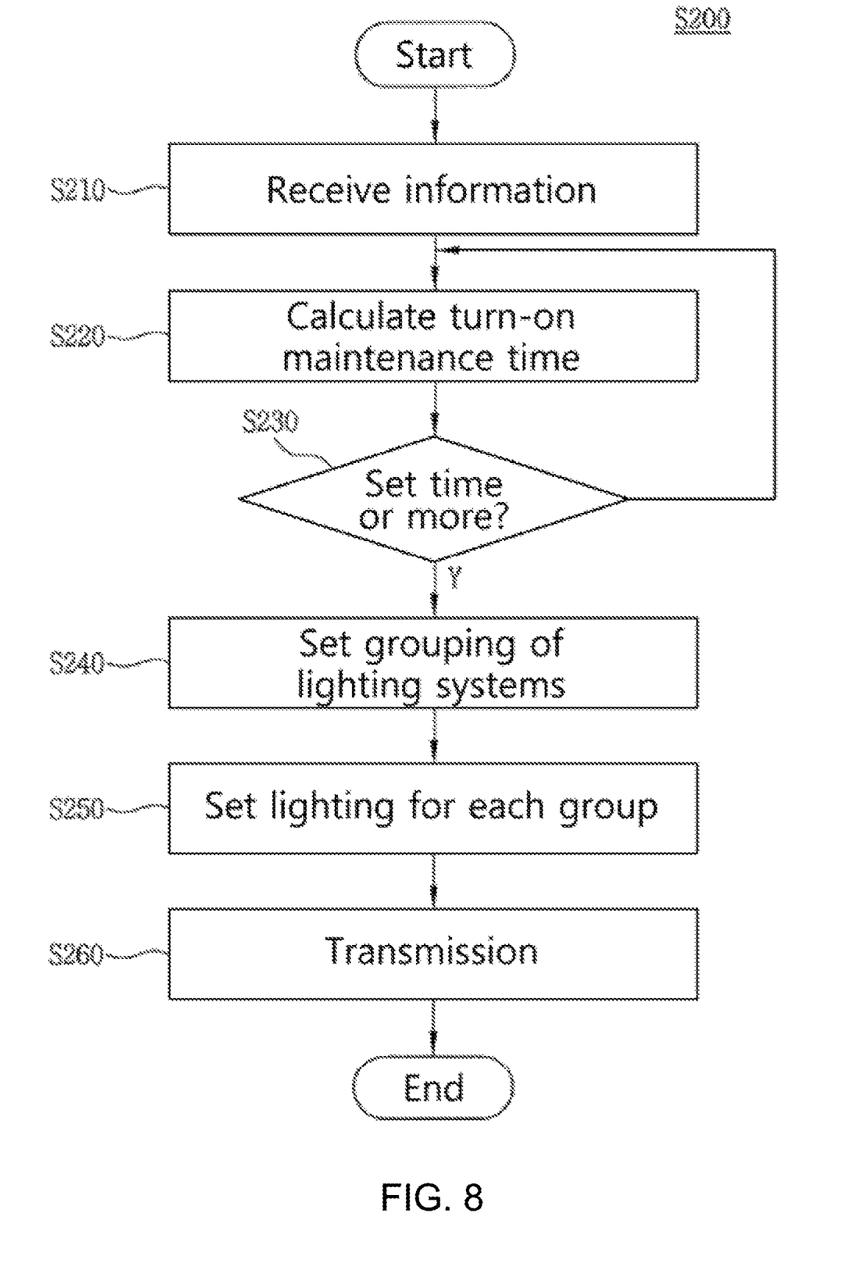
FIG. 8 is a flowchart illustrating step S200.

FIG. 8 is a flowchart illustrating step S200.

Referring to FIG. 8, step S200 includes step S210 of receiving state, environment and error information from the lighting systems 100, step S210 of calculating a possible turn-on maintenance time for each of the lighting systems 100, step S230 of determining whether a turn-on maintenance time corresponds to a set possible turn-on maintenance time, step S240 of grouping the lighting systems 100, step S250 of setting selective turn-on for each group, and step S260 of transmitting the set selective turn-on information to the lighting system 100.

Step S210 is the step of receiving state, environment and error information from the lighting systems 100. In this case, the server 200 receives each of the pieces of information, classifies the pieces of information based on unique information for each of the lighting systems 100, and stores the information in the server database 280. In this case, the consumption power monitoring unit 250 calculates previous average consumption power for each time zone based on a turn-on time for each of the lighting systems 100 and supply power of the lighting unit 160.

Furthermore, the charging monitoring unit 240 calculates an average amount of charge remaining in the battery for each year/month/day and for each time zone by collecting the amount of charge remaining in the battery and the amount of discharged battery power of the battery 130a for each time zone and environment information, and predicts an average amount of charge remaining in the battery and the amount of remaining battery power for each year/month/day and/or for each season in the future.

Furthermore, the environment monitoring unit computes the statistics of a solar radiation quantity, illuminance, wind velocity, a temperature and humidity for each time zone. The lighting monitoring unit 220 calculates average data of the turn-on times and turn-off times of each of the lighting systems for each year/month/day and for each time zone.

Furthermore, the prediction data calculation unit 270 predicts future consumption power, environment information and amount of charge remaining in the battery based on previous consumption power, amount of charge remaining in the battery 130a, environment information, and turn-on time, and predicts the turn-on time of each of the lighting systems 100 based on the predicted future consumption power, environment information and amount of charge remaining in the battery.

Step S220 is the step of calculating, by the server control unit 210, a possible turn-on time of each of the lighting systems 100 based on the current amount of remaining battery (130*a*) power, and comparing the calculated turn-on time with a turn-on time of each of the lighting systems 100 calculated by the prediction data calculation unit 270.

Step S230 is the step of grouping, by the server control unit 210, adjacent lighting systems 100 when a possible turn-on time based on the current amount of remaining battery (130*a*) power is smaller than a prediction turn-on time at step S230.

For example, a first lighting system and a second lighting system are adjacent streetlamps, and are configured to be grouped when a possible turn-on time based on the current amount of remaining battery (130*a*) power is significantly small.

Step S250 is the step of generating, by the server control unit 210, a control command so that the grouped lighting systems are selectively turned on. The selective turn-on enables the grouped lighting systems 100 to be alternately turned on so that the grouped lighting systems 100 are turned on due to an insufficient amount of remaining battery (130*a*) power of each of the lighting systems 100.

That is, a first lighting system and a second lighting system are installed at adjacent locations. When the first lighting system is turned on, the second lighting system is turned off. Thereafter, when the first lighting system is turned off, the second lighting system 0| is turned on. It is preferred that such turn-on and turn-off are configured to be repeatedly performed.

Step S260 is the step of transmitting, by the server control unit 210, the control command to the corresponding lighting system 100. Accordingly, the microprocessor 170 of a corresponding lighting system 100 may turn on the lighting driver 150 for a set time in response to a control command received through the communication unit 180, and controls the lighting unit 160 based on the amount of remaining battery (130*a*) power.

Step S300 is the step of directly connecting, by the mobile terminal 300, to each of the lighting systems 100 and checking state information, environment information, error information, and a control history stored in the storage unit 140. In this case, the mobile terminal 300 may directly control the lighting system 100 through an app. For example, a worker may transmit a turn-on or off command for the lighting unit 160 or a batch command, such as the charging circuit cut-off of the battery 130*a*, through his or her mobile terminal 300.

Furthermore, when an alarm message including whether a lighting system 100 is abnormal is received through the mobile terminal 300, a worker may identify access information (e.g., URL) of the lighting system 100 having an error included in the corresponding message, and may directly access the corresponding lighting system 100.

To this end, unique access information (e.g., URL) may be set in each of the lighting systems 100. The server 200 may set unique access information (e.g., URL) for each of the lighting systems 100. The server 200 may store unique access information for each of the lighting systems 100 and provide the unique access information to the mobile terminal 300.

The present invention can have the following effects through the aforementioned configuration.

First, the present invention can solve a disadvantage in that a microprocessor must be included in each of elements as in a conventional technology because the MPPT circuit unit 120, the battery charging unit 130, and the lighting driver 150 can be integrated and controlled by the single microprocessor 170.

Furthermore, according to the present invention, maintenance is easy because the mobile terminal 300 and the server 200 can directly or indirectly control each of the lighting systems 100 through LoRa-based communication.

Although the detailed examples of the present invention have been described in detail, it is evident to those skilled in the art that the present invention may be modified and changed in various manners within the technical spirit of the present invention, and such modifications and changes fall within the attached claims.

The invention claimed is:

1. A solar lighting system having an integrated control board, comprising:
   a Maximum Power Point Tracking (MPPT) circuit unit for calculating a maximum power point of electric energy generated from a solar panel and controlling a charging voltage of a battery;
   a battery charging unit for charging and discharging the battery using the electric energy controlled by the MPPT circuit unit;
   a lighting unit comprising LED modules having different rated outputs;
   a lighting driver for turning on or off the lighting unit by supplying power supplied by the battery; and
   a microprocessor for diagnosing an error and performing integrated control by checking an amount of remaining battery power, over charge of the battery, an amount of discharged battery power, a discharging time of the battery, and a lighting state and brightness of the lighting unit through the MPPT circuit unit, the battery charging unit, and the lighting driver and for controlling the lighting driver so that a driving current value is varied by detecting the rated outputs of the LED modules,
   wherein the microprocessor comprises:
   a measurement module for monitoring a turn-on or turn-off state and brightness of the MPPT circuit unit, the battery charging unit, the lighting driver, and the lighting unit, a load of each of the LEE modules, and whether an error occurs in each LED module; and
   a command setting module for controlling the lighting driver so that each of the LED modules has a driving current value suitable for the rated output of each LED module based on a set condition and diagnosis of the measurement module,
   wherein the MPPT circuit unit controls the charging voltage of the battery by estimating a maximum power point of electric energy generated from the solar panel and controlling a load so that the maximum power point is maintained,
   wherein the battery charging unit detects a material, voltage and maximum capacity of the battery, outputs the detected material, voltage and maximum capacity to the microprocessor, and performs charging and discharging based on a voltage/current value suitable for the material and capacity of the battery, and
   wherein the lighting unit is configured with a plurality of LEDs fixed within an inside of an inclusion body having an external surface downward inclined from a top of a light pole and is fixed to illuminate a ground through a block-shaped transparent cover in the downward-inclined external surface of the inclusion body.

2. The solar lighting system of claim 1, wherein the command setting module of the microprocessor controls the brightness of the lighting unit based on an amount of remaining battery power checked by the measurement module.

3. The solar lighting system of claim 1, further comprising:
- a sensor unit for detecting at least one of an operation, a solar radiation quantity, illuminance, a temperature, humidity or an air volume, and
- a storage unit for storing a voltage, current and power of generated electric energy of the MPPT circuit unit generated by the microprocessor, an amount of charge remaining in the battery, an amount of discharged battery power and variance of a battery charging unit for each time zone, operation information of the lighting unit, at least one of operation detection illuminance, an air volume, a solar radiation quantity, a temperature or humidity of the sensor unit, state information such as an error, and a control history, and
- wherein the microprocessor charges the battery by controlling the MPPT circuit unit so that the MPPT circuit calculates the maximum power point by increasing a voltage through control of a load based on the solar radiation quantity detected by the sensor unit.

4. A monitoring system using a solar lighting system having an integrated control board, the monitoring system comprising:
- a plurality of solar lighting systems according to claim 1;
- a server for receiving state information from the plurality of solar lighting systems and monitoring the plurality of solar lighting systems; and
- a mobile terminal for receiving, from the server or the solar lighting systems, a message including error information,
- wherein the solar lighting system transmits, to the server, the state information comprising at least one of an amount of charged battery power and an amount of discharged battery power for each time zone, a discharging time of the battery, a charging voltage of the battery, consumption power of a light for each time zone, a turn-on and turn-off time of the lighting unit, and a turn-on maintenance time; environment information comprising at least one of a temperature, humidity, intensity of illumination, a solar radiation quantity, and wind velocity for each time zone; and error information such as over charge or non-charging of the battery and a failure of the lighting unit, and
- wherein the server comprises:
  - a consumption power monitoring unit for calculating an average value of consumption power of each of the solar lighting systems for each time zone by monitoring consumption power of the solar lighting systems for each year/month/day/time zone;
  - a charging monitoring unit for calculating an average value by monitoring an amount of remaining battery power and a charging voltage and discharging time of the battery for each time zone of each of the solar lighting systems;
  - an environment information monitoring unit for calculating an average value by monitoring a sunrise and sunset time, a number of sunless days, a solar radiation quantity, illuminance, a temperature, humidity, and an air volume based on the environment information of the solar lighting systems; and
  - a lighting monitoring unit for calculating an average value by monitoring a turn-on and turn-off time and turn-on maintenance time of each of the solar lighting systems for each year/month/day/time zone and storing the average value in the server database;
  - a prediction data calculation unit for calculating prediction data for predicting consumption power and a possible turn-on time of each of the solar lighting systems based on information collected from the charging monitoring unit, the environment information monitoring unit, and the consumption power monitoring unit; and
  - a server control unit for checking a possible turn-on time of an actual solar lighting system based on a predicted possible-turn on time, predicted consumption power and current amount of power remaining in the battery of each of the solar lighting systems, grouping a plurality of adjacent solar lighting systems, and controlling the solar lighting systems to be alternately turned on or off.

5. The monitoring system of claim 4, wherein:
unique access information is assigned to the solar lighting system, and the mobile terminal directly accesses the solar lighting system based on the unique access information received from the server using an app, checks a control history, and directly transmits a control command.

6. The monitoring system of claim 4, wherein the solar lighting system comprises a long range wide-area network (LoRa)-based communication unit and communicates with the server or the mobile terminal.

* * * * *